United States Patent Office 3,014,784
Patented Dec. 26, 1961

3,014,784
MAKING FERRIC PYROPHOSPHATE HYDRATE
Harmon M. Knight, La Marque, and Joe T. Kelly, Dickinson, Tex., assignors to The American Oil Company, Texas City, Tex., a corporation of Texas
No Drawing. Filed Oct. 20, 1958, Ser. No. 768,022
5 Claims. (Cl. 23—105)

This invention relates to ferric pyrophosphate hydrate and particularly ferric pyrophosphate hydrate especially suitable as an intermediate in the preparation of a catalyst for hydrocarbon reactions.

In patent U.S. 2,824,146, there is described an alkylation process utilizing a catalyst system consisting essentially of boron trifluoride and a solid complex of ferric pyrophosphate hydrate with $BF_3$. This catalyst system is distinguished by its ability to react isobutane and ethylene.

The best results with respect to alkylate yield and quality, are obtained when the particular ferric pyrophosphate hydrate is used as an intermediate in the formation of the hydrate—$BF_3$ complex; the particular ferric pyrophosphate hydrate, for this optimum activity catalyst system, is controlled both with respect to hydrate water content and pyrophosphate compound impurities— the impurities being controlled by the method of preparing the ferric pyrophosphate hydrate.

In the method of the invention, ferric pyrophosphate hydrate is made by reacting a water soluble ferric salt and a water soluble metal pyrophosphate, in water solution, to produce a precipitate of ferric pyrophosphate hydrate, wherein said ferric salt is added in an amount between about 10% and 100% in excess of the theoretical requirement, water-washing said precipitate to remove occluded reaction solution and drying said washed ferric pyrophosphate hydrate at a temperature below about 110° C. to obtain a hydrate product having a total water content between about 11 and 19 weight percent.

The ferric pyrophosphate hydrate is made by reacting a water soluble ferric salt with a water soluble metal pyrophosphate. The ferric salt reactant should not precipitate as ferric hydroxide when contacted with water. This can be avoided by slightly acidifying the water. Illustrative salts suitable for use in the method are ferric bromide, ferric chloride, ferric formate, ferric nitrate, ferric sulfate, and ferric acetate. The alkali-metal pyrophosphates such as sodium pyrophosphate and potassium pyrophosphate are particularly suitable for use in the method of the invention.

The ferric salt is preferably dissolved in water and the pyrophosphate added to the aqueous solution of ferric salt. The reaction may be carried out at ordinary temperatures or with hot water; it is preferred to use luke warm water. In order to obtain the most effective catalyst system, it is necessary that an excess of ferric ion be present in the aqueous reaction zone. It is to be understood that the excess ferric ion is calculated on the amount theoretically needed to react with the pyrophosphate ion present to produce ferric pyrophosphate— $Fe_4(P_2O_7)_3$. The excess usage of ferric ion should be at least about 10 mole percent. As much as 100% excess may be used or even more; however, extremely large excess usages do not appear to impart significantly better properties to the catalyst produced from the product ferric pyrophosphate hydrate. In general, it is preferred to use between about 25% and 75% excess ferric ion in the aqueous reaction zone.

A precipitate of ferric pyrophosphate hydrate is obtained by the reaction of the ferric salt and the metal pyrophosphate. In general, this precipitate is separated from the aqueous reaction medium and then water-washed to remove occluded reaction solution. Although it is not necessary, the water-washed precipitate may be contacted with anhydrous alcohol to remove superficial water, in order to decrease the drying time in the succeeding drying step.

The washed ferric pyrophosphate hydrate is dried (heated) at a temperature below about 110° C. for a time needed to obtain a hydrate product having a total water content between about 11 and 19 weight percent; it is preferred to have a product containing between about 13 and 18 weight percent of total water. The drying may be carried out at atmospheric pressure or at reduced pressure. It is important to the quality of the hydrate product, as determined by catalytic activity of catalysts prepared therefrom, that overheating be avoided in the drying procedure. It has been found that by controlling the temperature of the drying step at below about 110° C. produces a satisfactory hydrate product. It is preferred to dry the washed ferric pyrophosphate hydrate at a temperature between about 80° and 95° C. at atmospheric pressure, i.e., ambient pressure.

The above conditions produce a product containing water of hydration. Owing to the ability of ferric pyrophosphate to produce hydrate salts having a different number of moles of hydrate water, the product hydrate may not analyze to a water content corresponding to any one of the possible hydrate forms of ferric pyrophosphate. The total water content of the ferric pyrophosphate hydrate product of between about 11 and 19 weight percent, corresponds approximately to ferric pyrophosphate hydrate containing from 5 to 10 moles of water of hydration per mole of ferric pyrophosphate present. It is preferred to have a hydrate product containing between about 6 and 9 moles of water per mole of ferric pyrophosphate; this corresponds approximately to a total water content of between about 13 and 18 weight percent. It is to be understood that total water content is calculated on the basis of the hydrated salt.

In the formation of the precipitate, more rapid settling may be obtained by the use of a flocculent. A particularly good flocculent is a polyacrylamide, which is sold commercially as separan 2610.

EXAMPLE

The following illustrates the preferred procedure for preparing ferric pyrophosphate hydrate. Twenty-five milliliters of concentrated $HNO_3$ and 1,000 gm. of technical grade $Fe(NO_3)_3 \cdot 9H_2O$ are dissolved in about 15 liters of distilled water. 300 gm. anhydrous $Na_4P_2O_7$ are then slowly added, with stirring, over about a 15-minute period, after which stirring was continued for another 15 minutes. A freshly prepared solution of 5 gm. of flocculent polyacrylamide in 1,000-ml. hot, distilled water is added rather rapidly. The precipitated salt crystals are allowed to settle. The clear, top layer is decanted; the remaining slurry is filtered. These solids are washed with three 4-liter portions of hot, distilled water, and finally with 1 pound of absolute methanol. The washed filter cake is transferred to an evaporating dish and dried in a forced-draft oven at 88°–91° C. for about 15 hours. It is then passed through a 40-mesh sieve. It is analyzed for water content, and if necessary, returned to the oven to be dried at about 110° C. to the desired hydrate level. Frequent mixing during this final period insures uniform drying. After drying, the salt is transferred to a dry container under conditions to avoid adsorption of atmospheric moisture. About 250 gm. of finished product is obtained per batch.

*Illustrative alkylation runs*

The effectiveness of ferric pyrophosphate hydrate made by the method of the invention is illustrated by the reaction of ethylene and isobutane using the catalyst system described in detail in U.S. 2,824,146. Briefly, the catalyst system consists of a solid complex formed by the reaction of ferric pyrophosphate hydrate and $BF_3$—usually one mole of $BF_3$ is present per mole of water of hydration present, and $BF_3$ in excess of that needed to react with the hydrate. The hydrocarbons to be treated are contacted with the catalyst system. The illustrative runs were carried out according to the following procedure.

A 4.6-liter carbon steel stirred reactor was used for all runs. An impeller at the reactor bottom gave top-to-bottom mixing of the reactants and catalyst. The impeller speed was held constant at 1,600 r.p.m. Ferric pyrophosphate powder (200 gm.) was charged and the reactor evacuated. 1,600 gm. of technical grade isobutane was then added and anhydrous $BF_3$ pressured in. Since the complex formation between $BF_3$ and ferric pyrophosphate is extremely exothermic, coolant was circulated in the reactor jacket to maintain the temperature below about 70° F. The reactor was then stirred for 1 hour to allow more complete complex formation between the hydrated salt and $BF_3$, after which the temperature was adjusted to 30–35° F. Approximately 150 gm. of technical grade ethylene was added over a period of 2½ hours through a porous metal disc near the reactor bottom. After the ethylene was added, the reactor contents were stirred for an additional one-half hour, and then salt was allowed to settle. The liquid portion of the reactor contents was pressured into a cold, evacuated bomb and washed with water to remove dissolved $BF_3$. Samples were taken for Podbielniak analyses, and the remainder of the product was depentanized on a Hyper-Cal column. Depentanized product was distilled to 350° F. overhead temperature on a 1-plate column.

The results of 4 runs carried out under slightly different conditions are set out in the table. In all runs, the ferric pyrophosphate hydrate was prepared by the procedure described in detail above. Essentially the only difference between the conditions for Runs 1—2 and Runs 3—4 is in the hydrate water content of the hydrate salt.

The runs show very clearly the great improvement obtained in yield, and the remarkable shift in product distribution toward the hexane hydrocarbons, which are so desired at this time for high octane gasolines. In Run No. 1, where the theoretical amount of ferric ion was used in the making of the salt, the higher boiling heptanes, etc., were the predominant materials in the alkylate. Run No. 3 shows that at only 12% excess of ferric ion, the hexanes became predominant. Run No. 2 shows that increasing the excess ferric ion to 65% results in a significant increase in yield and maintenance of the excellent distribution obtained in Run No. 4 at lower excess ferric ion usage.

Thus having described the invention, what is claimed is:

TABLE

| Run No. | 1 | 2 | 3 | 4 |
|---|---|---|---|---|
| Conditions: | | | | |
| Isobutane/Ethylene (molar) | 4.5 | | 4.7 | |
| Time, hours | 3.0 | | 4.5 | |
| Temperature, ° C | 0 | | 0 | |
| $BF_3$/Hydrate (wt.) | 1.3 | | [3] 3.7 | |
| Hydrate water content, wt. percent | [2] 17.7 | | [4] 12.7 | |
| Percent Excess Ferric Ion Used in Hydrate Preparation | None | 65 | 12 | 25 |
| Alkylate Production [1]: | | | | |
| Pentanes | 0 | 0 | 3 | 1 |
| Hexanes | 79 | 177 | 120 | 159 |
| Heptanes and higher | 96 | 83 | 97 | 73 |
| Depentanized yield | 175 | 260 | 217 | 232 |

[1] Based on ethylene charged.
[2] Corresponds to $Fe_4(P_2O_7)_3 \cdot 9H_2O$.
[3] Hydrocarbon/hydrate plus $BF_3$.
[4] Corresponds to $Fe_4(P_2O_7)_3 \cdot 6H_2O$.

We claim:
1. A method of preparing a ferric pyrophospate hydrate, which method comprises reacting a water soluble ferric salt and a water soluble metal pyrophosphate, in water solution, to produce a precipitate of ferric pyrophosphate hydrate, wherein said ferric salt is added in an amount between about 10% and 100% in excess of the theoretical requirement, water-washing said precipitate to remove occluded reaction solution and drying said washed ferric pyrophosphate hydrate at a temperature below about 110° C. to obtain a hydrate product having a total water content between about 11 and 19 weight percent.

2. The method of claim 1 wherein said ferric salt is present in an amount between about 25% and 75% excess.

3. The method of claim 1 wherein said drying is carried out at a temperature between about 80° and 95° C. at atmospheric pressure.

4. The method of claim 1 wherein said hydrate product contains between about 13 and 18 weight percent of total water.

5. A method of preparing a ferric pyrosphosphate hydrate, which method comprises reacting, in water solution, ferric nitrate and alkali-metal pyrophosphate, to produce a precipitate of ferric pyrophosphate hydrate, having present ferric nitrate in an amount of from 25–75 percent in excess of the theoretical requirement, water-washing said precipitate to remove occluded reaction solution, and drying said precipitate at a temperature between about 80° and 95° C., at atmospheric pressure, to obtain a ferric pyrophosphate hydrate having a hydrate water content of between 6 and 9 moles per mole of ferric pyrophosphate.

References Cited in the file of this patent

UNITED STATES PATENTS

| 2,380,614 | Semon | July 31, 1945 |
| 2,412,230 | Schaad | Dec. 10, 1946 |
| 2,824,146 | Kelley et al. | Feb. 18, 1958 |

OTHER REFERENCES

Mellor: Comprehensive Treatise On Inorganic and Theoretical Chem., vol. 14, Longmans, Green and Co., 1935, pages 412–413.